US012523065B2

(12) United States Patent
Caplow-Munro et al.

(10) Patent No.: US 12,523,065 B2
(45) Date of Patent: Jan. 13, 2026

(54) COMPLIANT MAGNETIC LOCKING MECHANISM

(71) Applicant: Microsoft Technology Licensing, LLC, Redmond, WA (US)

(72) Inventors: Devin Caplow-Munro, Seattle, WA (US); Amit Kaistha, Coppell, TX (US); Denys Yaremenko, Carnation, WA (US); Brett Tomky, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

(21) Appl. No.: 18/337,961

(22) Filed: Jun. 20, 2023

(65) Prior Publication Data

US 2024/0426137 A1 Dec. 26, 2024

(51) Int. Cl.
*E05B 47/00* (2006.01)
*E05B 65/00* (2006.01)

(52) U.S. Cl.
CPC ...... *E05B 47/0042* (2013.01); *E05B 47/0045* (2013.01); *E05B 65/006* (2013.01)

(58) Field of Classification Search
CPC .. E05B 47/00; E05B 47/0042; E05B 47/0045; E05B 65/006
USPC .................................................. 70/57.1, 413
See application file for complete search history.

(56) References Cited

U.S. PATENT DOCUMENTS

| | | | | |
|---|---|---|---|---|
| 3,654,782 | A * | 4/1972 | Heimann | E05B 47/0044 70/276 |
| 4,919,464 | A * | 4/1990 | Richards | E05B 47/0038 292/201 |
| 7,822,446 | B2 | 10/2010 | Vatanparast et al. | |
| 2007/0026297 | A1 | 2/2007 | Qin et al. | |
| 2010/0050710 | A1 | 3/2010 | Lax et al. | |
| 2020/0399933 | A1 * | 12/2020 | Kelsch | E05B 35/008 |

FOREIGN PATENT DOCUMENTS

CN 103118153 A 5/2013

OTHER PUBLICATIONS

"Tot Lok—the Original Magnet lock", Retrieved from: https://protectenfant.com/shop/totlok-magnet-loquet, Retrieved Date: Apr. 27, 2023, 8 Pages.

* cited by examiner

*Primary Examiner* — Suzanne L Barrett
(74) *Attorney, Agent, or Firm* — Holzer Patel Drennan

(57) ABSTRACT

The presently disclosed compliant magnetic locking mechanisms provide mechanism(s) and method(s) for latching a cover (e.g., a rear cover) to a device body that is quick assembling, low cost, easily recyclable, secure, and/or leaves no exposed fasteners. A bi-stable (or mono-stable) compliant mechanism inside the cover actuates a set of latches in and out. This action serves to lock and unlock the cover or other removable portion of the computing device. The compliant magnetic locking mechanisms may contain an array of magnets, which can be used in conjunction with a magnetic key to actuate the compliant mechanism from the exterior.

19 Claims, 6 Drawing Sheets

COMPLIANT MAGNETIC LOCKING MECHANISM

BACKGROUND

It is increasingly important to build low cost and sustainable computing devices that deliver a high degree of cosmetic performance. Many existing computing devices rely on screwed or snapped connections for final assembly, such as placing a cover on a device body of the computing device.

SUMMARY

Implementations described and claimed herein provide a compliant magnetic locking mechanism comprising a mechanism housing; a rotatable hub including a first radial arrangement of magnetic or ferromagnetic inserts seated within the mechanism housing; one or more arms, each extending outwardly from the hub within the mechanism housing; and one or more latches, each attached to one of the arms. A first position of the rotatable hub presses outward on the arms and extends the latches from the mechanism housing into corresponding latch receptacles within an article, thereby locking the mechanism housing to the article. A second position of the rotatable hub pulls inward on the arms and retracts the latches out of the corresponding latch receptacles and into the mechanism housing, thereby unlocking the mechanism housing from the article.

Implementations described and claimed herein further provide a computing device comprising a device body including a cover recess and one or more latch receptacles, and a cover fit within the cover recess. The cover includes a mechanism housing and a compliant magnetic locking mechanism.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Screwed connections are often time consuming to effect and yield exposed fasteners in the end product that may be unsightly and/or encourage tampering (e.g., removal by a non-authorized user). Snapped connections may be faster than screwed connections to effect, but can be difficult to undo without damaging the cover or the device body, even by an authorized user (e.g., to conduct authorized repairs). Further, snapped connections may be similarly unsightly and/or encourage tampering to screwed connections.

The presently disclosed technology is directed at providing a fast, but tamper resistant solution for final assembly of a computing device, such as placing and securing a cover to a device body for the computing device. A cover that incorporates one of the presently disclosed compliant magnetic locking mechanisms is capable of being quickly and easily attached (e.g., during initial or repaired end product assembly) and detached (e.g., to conduct authorized repairs) from the device body without damaging the cover or the device body, so long as a correct magnetic key is used. Without the correct magnetic key, it is difficult to detach the cover from the device body without damaging the cover or the device body. Further, the presently disclosed compliant magnetic locking mechanisms are fully hidden from view in the assembled end product, thereby discouraging tampering (e.g., removal by a non-authorized user).

Some existing devices incorporate an over-molded or adhered finishing cover to conceal unsightly snapped or screwed connections. However, this additional component adds expense and reduces the recyclability of the end product by making the cover more difficult to remove. By making the presently disclosed compliant magnetic locking mechanisms fully hidden from view in the assembled end product, an over-molded or adhered finishing cover is unnecessary and can be omitted. This avoids the additional expense of a finishing cover, as well as the reduced recyclability of an end product that incorporates a finishing cover.

Further, existing screwed or snapped connections often suffer from rattling due to assembly tolerances that may change or even grow over time, particularly as the computing device is handled roughly. Specifically, screwed connections may become inadvertently loosened and/or materials used in device body, cover and/or snap connection therebetween may shrink and/or become more brittle over time. The presently disclosed compliant magnetic locking mechanisms may be bi-stable (to a locked and an unlocked position) or mono-stable (to a locked position only). Both allows the compliant magnetic locking mechanisms to account for any slight chances in tolerance between the device body and the cover that may occur over time.

Figure 1A:
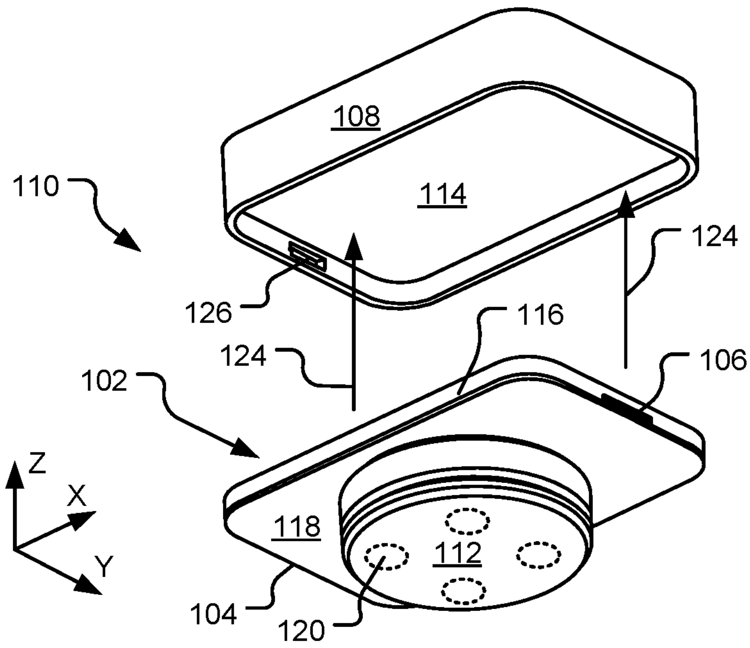
FIG. 1A illustrates an example cover with a compliant magnetic locking mechanism being fit to a device body for a computing device using a magnetic key.
Figure 2:
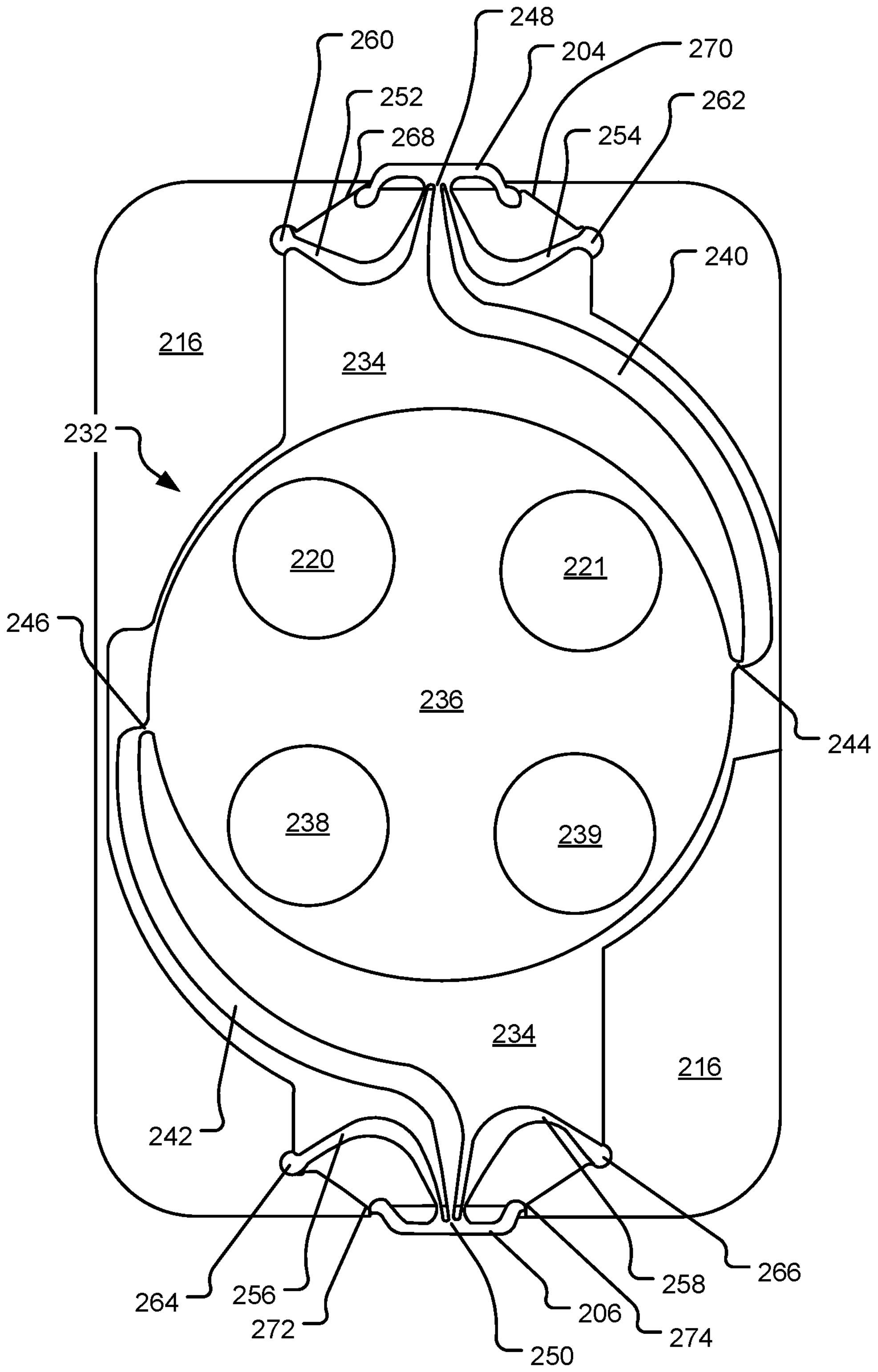
FIG. 2 illustrates an example compliant magnetic locking mechanism in a locked position.

FIG. 1A illustrates an example cover 102 with a compliant magnetic locking mechanism (not shown but for latches 104, 106, see e.g., compliant magnetic locking mechanism 232 of FIG. 2) being fit to a device body 108 for a computing device 110 using a magnetic key 112. The device body 108 is a housing for the computing device 110 that encloses a variety of internal components that render the computing device 110 functional as such. The device body 108 is generally prismatic with a cover recess 114 that permits the cover 102 to seat to the device body 108 and remain centered in the x-y plane when seated. The cover 102 is selectively attached to the device body 108 in order to secure the internal components therein and seal the interior of the computing device 110 from external contamination. The cover recess 114 may improve the seal between the cover 102 and the device body 108 and/or increase the resistance of the cover 102 from being pried apart from the device body 108 using brute force. Other implementations may utilize a different three-dimensional shape for the device body 108 with the same or similar effect to that described below.

The computing device 110 may be any sort of computing device (e.g., a tablet computer, laptop computer, personal computer, gaming device, smart phone, or any other discrete device that receives physical user inputs and carries out one or more sets of arithmetic and/or logical operations), an input device for a computing device (e.g., a handheld controller, keyboard, trackpad, or mouse), or a device that is not necessarily related to computing at all (e.g., a vehicle component of controller, consumer electronics (e.g., cameras, telephones, and home appliances), medical devices, and industrial or commercial machinery) that has internal components sealed by a removable cover 102.

The cover 102 includes a cover housing 116 that encompasses much or all of the compliant magnetic locking mechanism and a cover plate 118 that seals the compliant magnetic locking mechanism within the cover housing 116. The cover plate 118 may be a rubber or rubber-like material that is adhered to the cover housing 116 or a rigid cover plate that is snapped, bolted, or screwed in place, for example.

Figure 1B:
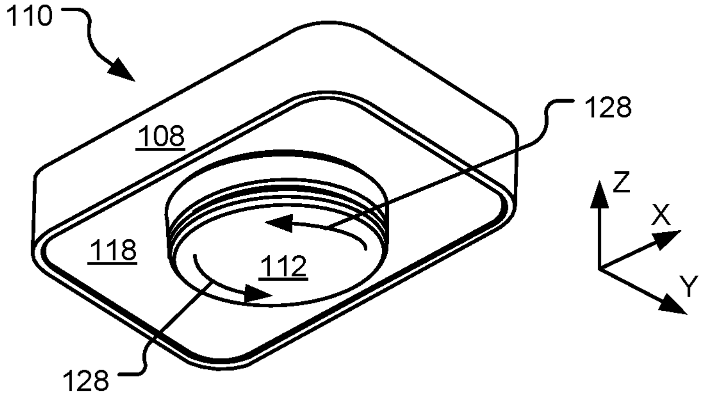
FIG. 1B illustrates rotation of the magnetic key with reference to the cover to move the compliant magnetic locking mechanism to a locked position.
Figure 1C:
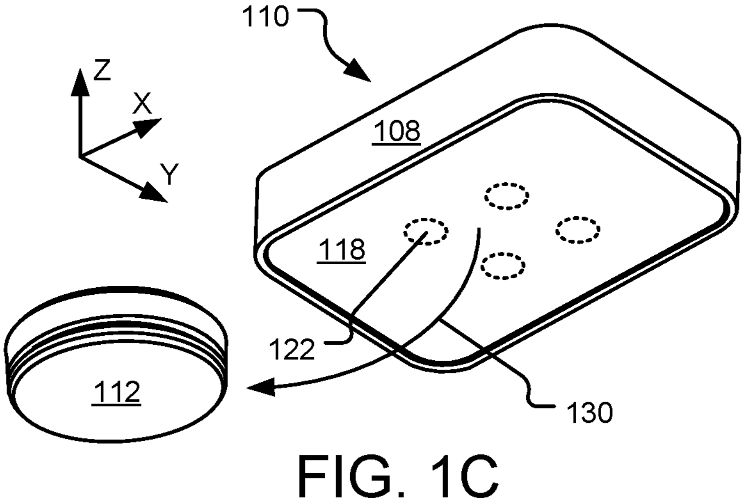
FIG. 1C illustrates the magnetic key being removed from the cover once the compliant magnetic locking mechanism is moved to the locked position.

The latches 104, 106 forming the visible part of the compliant magnetic locking mechanism in FIGS. 1A-1C are retracted in the depicted first (unlocked or retracted) position of FIG. 1A. The magnetic key 112 is magnetically attached to an exterior surface of the cover 102 and serves as a handle for picking and placing the cover 102 onto the cover housing 116 and within the cover recess 114, as illustrated by arrows 124. Specifically, the magnetic key 112 includes an arrangement of magnets therein (e.g., magnet 120, all shown in broken lines in FIG. 1A as they would not normally be visible from an exterior of the magnetic key 112) that corresponds to a similar arrangement of magnets (or ferromagnetic elements) within the cover 102 (e.g., magnet 122, all shown in broken lines in FIG. 1C as they would not normally be visible from an exterior of the cover 102). As the magnetic key 112 is matched to the cover 102, magnetic attraction causes the magnetic key 112 to bias to a centered position over the cover 102 with magnets (or ferromagnetic elements) within the magnetic key 112 aligned in the z-direction with corresponding magnets (or ferromagnetic elements) within the cover 102. This could be technically advantageous in that the ergonomics of the magnetic key 112 may reduce assembly and/or disassembly time as compared to a existing solution where no pick and place device is used.

Latch receptacles (e.g., latch receptacle 126) in the device body 108 correspond to the latches 104, 106, respectively, each of which selectively engages with its respective latch when the cover 102 is locked to the device body, as described below. While two latch receptacles and a corresponding two latches are explicitly shown and described, any number of latch receptacles and latches may be used within the computing device 110 to achieve a desired level of security and overall performance (e.g., the four latches 404, 405, 406, 407 of FIG. 4 would correspond to four latch receptacles).

FIG. 1B illustrates rotation of the magnetic key 112 with reference to the cover 102 to move the compliant magnetic locking mechanism to a second (or locked) position. As noted above, the latches 104, 106 are retracted in the depicted first (unlocked or retracted) position of FIG. 1A. The magnetic key 112 is placed upon the depicted side of the cover 102 (here, adjacent the cover plate 118), as also illustrated in FIG. 1A. Once the cover 102 is placed in position on the device body 108 within the cover recess 114, a user may manually rotate or a machine may induce a mechanized rotation of the magnetic key 112 in the x-y plane, as illustrated by arrows 128 and shown in FIG. 1B. This induces a corresponding rotation of the compliant magnetic locking mechanism within the cover 102 between the first (unlocked) position where the latches 104, 106 are retracted and a second position (locked) where the latches 104, 106 are extended.

FIG. 1C illustrates the magnetic key 112 being removed from the cover 102 once the compliant magnetic locking mechanism is moved to the second (or locked) position. Once the cover 102 is locked in place on the device body 108, a user may manually lift or a machine may induce a mechanized lift of the magnetic key 112 off the cover 102, as illustrated by arrow 130 and shown in FIG. 1C. The lifting force is sufficient to overcome the magnetic attraction between the arrangement of magnets (or ferromagnetic elements) within the magnetic key 112 (e.g., magnet 120) and the arrangement of magnets (or ferromagnetic elements) within the cover 102 (e.g., magnet 122). The magnetic key 112 can then be used for subsequent pick-and-place operations for the cover 102 (e.g., during maintenance or repair of the computing device 110) or for other similar covers for other computing devices.

The compliant magnetic locking mechanisms disclosed herein are technically advantageous over the existing solutions in that they provide selective authorized access to an interior of the computing device 110, without utilizing exposed fasteners, which have a variety of disadvantages as described above. Further, unlike many existing snapped connections, the cover 102 is uniformly thin in the z-direction in that it does not protrude in the z-direction around a snap area on the device body 108. This allow the cover 102 to be more easily manufactured and assembled onto the device body 108.

The cover 102 also permits a rapid assembly and disassembly process for an authorized user that possesses the magnetic key 112 (or tooling that includes the magnetic key 112), which is technically advantageous over an existing cover that adopts multiple screwed connections, the sum of which may take significantly longer to assemble and disassemble. Further, screw fasteners add additional part cost, which can be avoided by the presently disclosed compliant magnetic locking mechanisms. Still further, the presently disclosed compliant magnetic locking mechanisms avoid the additional expense of a finishing cover, as well as the reduced recyclability of an end product that incorporates a finishing cover. Further still, as the cover 102 can quickly and easily be removed with the magnetic key 112, the presently disclosed compliant magnetic locking mechanisms support recyclability of the computing device 110 by allowing its constituent components to be more quickly and easily separated into their respective recycling streams.

The cover 102 is further technically advantageous over existing covers as it is secure and relatively tamper-proof so long as the magnetic key 112 is not available. The absence of exposed fasteners or other exposed features such as that found in existing covers that would otherwise invite tampering discourages the same of the cover 102.

FIG. 2 illustrates an example compliant magnetic locking mechanism 232 in a locked position. The compliant magnetic locking mechanism 232 is housed within a recess 234 in a mechanism housing 216 (e.g., cover housing 116 for cover 102 of FIG. 1A). The recess 234 is specifically formed in the mechanism housing 216 to accommodate the compliant magnetic locking mechanism 232 in the locked position depicted in FIG. 2, an unlocked position, such as that depicted in FIG. 3, and all positions therebetween. In various implementations, the mechanism housing 216 may be molded or otherwise created with the recess 234 in place, or molded or otherwise created without the recess 234 with a subsequent machining process to create the recess 234. The recess 234 in the mechanism housing 216 is technically advantageous to a solution that lacks such a recess in that the internal components of the locking mechanism 232 can be housed within the recess 234, thereby decreasing a thickness required for the locking mechanism 232.

The compliant magnetic locking mechanism 232 includes a rotatable hub 236 with a radial arrangement of magnetic or ferromagnetic inserts 220, 221, 238, 239 seated within the mechanism housing 216. The inserts 220, 221, 238, 239 are slid or press fit within apertures in the hub 236 and the hub 236 is free-floating within the recess 234 with a tolerance with the mechanism housing 216 that permits rotation of the hub 236 within the recess 234. Other implementations may mount the rotatable hub 236 on a central pivot. Use of the rotatable hub 236 is technically advantageous over other solutions in that it provides an efficient structure and efficient usage of that structure for moving the locking mechanism 232 between locked and unlocked positions.

Figure 3:
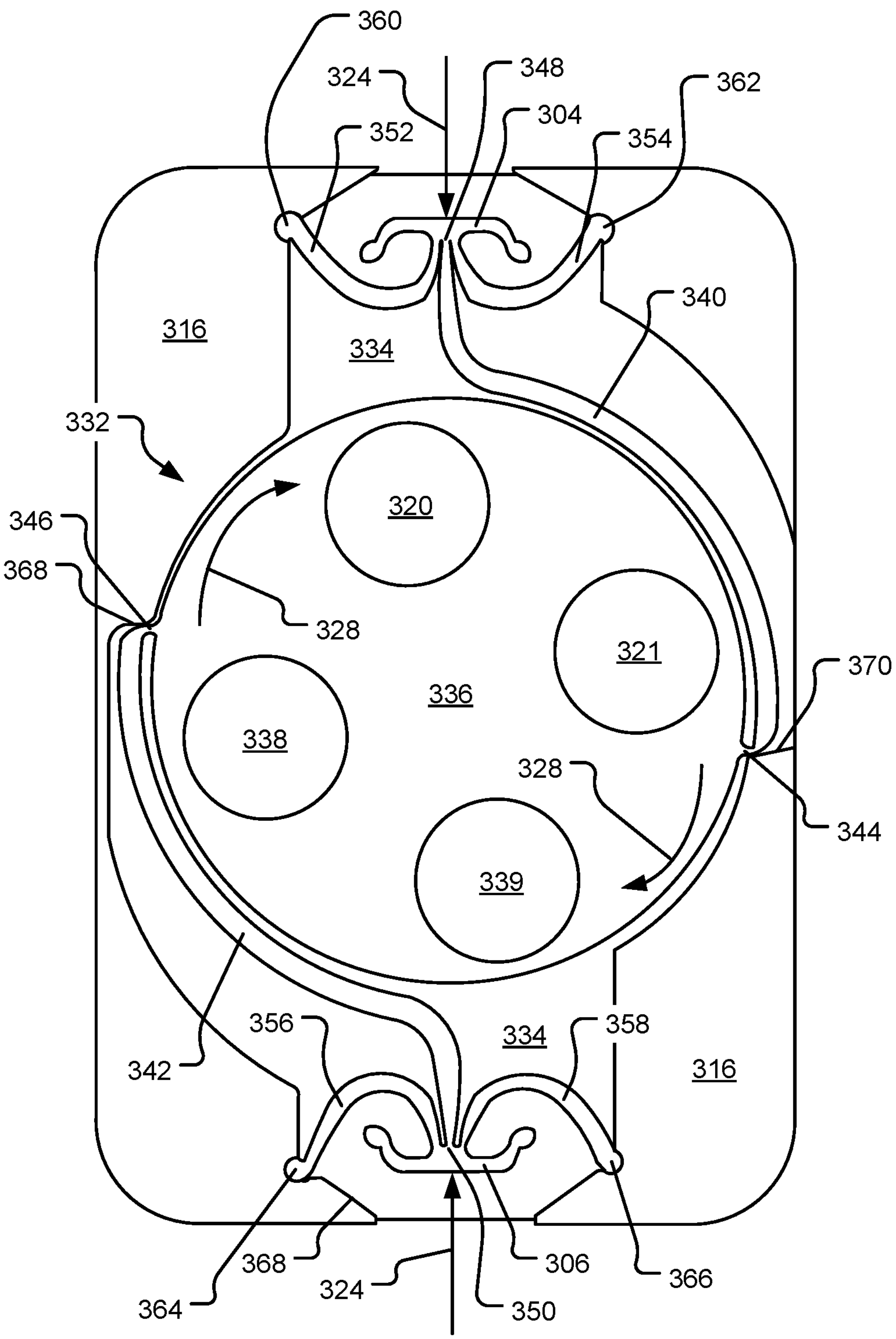
FIG. 3 illustrates another example compliant magnetic locking mechanism in an unlocked position.

In implementations where the inserts 220, 221, 238, 239 are magnetic, a similar arrangement of magnets or ferromagnetic elements within a magnetic key (not shown, see e.g., magnetic key 112 of FIGS. 1A-C) are used to engage the compliant magnetic locking mechanism 232 without externally accessible fasteners. In implementations where the inserts 220, 221, 238, 239 are ferromagnetic, the magnetic key incorporates magnetic elements to engage the compliant magnetic locking mechanism 232. Specifically, the magnetic key includes a radial arrangement of magnetic or ferromagnetic inserts that match the inserts 220, 221, 238, 239. When the magnetic key is placed adjacent the mechanism housing 216, rotation of the magnetic key induces corresponding rotation of the rotatable hub 236 between a first (locked) position and a second (unlocked) position. While an arrangement of four cylindrical-shaped inserts 220, 221, 238, 239 are illustrated in FIGS. 2 and 3, any two or more inserts arranged in a radial manner on the hub 236, each of which having any desired shape, may be used so long as they may be matched to a similar arrangement of magnets or ferromagnetic elements within the magnetic key.

The number, polar orientation, and placement of each of the individual magnets within the compliant magnetic locking mechanism 232 can be varied to increase the difficulty of reproducing a magnetic key that would serve to lock and unlock the compliant magnetic locking mechanism 232. This is technically advantageous in that increases security of a corresponding device in that possession of an authorized key is needed to open the device. Further, the magnetic attraction of the magnets in sum within the compliant magnetic locking mechanism 232 can be balanced against the resistance to movement between the locked and unlocked positions so that for a magnetic key to be functional, it may require a large portion (or all) of the magnets in sum to be engaged to overcome the resistance to movement provided by the compliant magnetic locking mechanism 232. This further increases security by increasing the difficulty of reproducing a functional key that is similar to, but not the same as, the authorized key. The magnets can also serve as a mounting structure for attaching a corresponding computing device to another object that is magnetic or ferromagnetic (or incorporates magnetic or ferromagnetic elements), such as a wall, table, desk, vehicle dash, charger, and so on. Other implementations may lack magnets and adopt an alternative actuation mechanism (e.g., apertures that extend through an associated computing device for physical manipulation of the rotatable hub 236 or an actuator controlled by an associated computing device).

A pair of arms 240, 242 extend outwardly in a spiral formation from the hub 236 within the recess 234 of the mechanism housing 216. The arms 240, 242 are connected to the hub 236 at their proximal ends by living hinges 244, 246, respectively. The arms 240, 242 are used to convert rotation of the hub 236 into linear movement at their distal ends where latches 204, 206, respectively, are attached. The latches 204, 206 are also connected to the arms 240, 242 by living hinges 248, 250, respectively. The latches 204, 206 serve to selectively engage with latch receptacles (not shown, see e.g., latch receptacle 126 of FIG. 1A) in a device body (not shown, see e.g., device body 108 of FIGS. 1A-C) for a computing device (not shown, see e.g., computing device 110 of FIGS. 1A-C). The spiral formation of the arms 240, 242 may be technically advantageous over other formations in that it provides room for longer arms, allows for generally equidistant spacing of the arms, and allows for flexibility in terms of stroke for the latches 204, 206 and any spring force applied by the arms 240, 242.

Further, the spiral formation of the arms 240, 242 accommodates the generally circular hub 236 in the middle, which in turn accommodates the inserts 220, 221, 238, 239. The hub 236 provides real estate for housing the inserts 220, 221, 238, 239. In other implementations where the hub 236 does not accommodate the inserts 220, 221, 238, 239 (or other components), the hub 236 could be smaller and not necessarily circular, which would allow the arms 240, 242 to be straight (in a hub-and-spoke fashion), while maintaining the mechanical advantages of the depicted spiral formation.

The latches 204, 206 engage the latch receptacles in the depicted locked position of FIG. 2, while the latches 204, 206 disengage the latch receptacles in the unlocked position of FIG. 3. Specifically, the first (locked) position of the hub 236, as illustrated in FIG. 2, presses outward on the arms 240, 242 and extends the latches 204, 206 from the mechanism housing 216 (or cover housing 116 of FIG. 1) into corresponding latch receptacles within an article (e.g., device body 108 of FIGS. 1A-C), thereby locking the mechanism housing 216 to the article. A second (unlocked) position of the hub 236 (see e.g., FIG. 3) pulls inward on the arms 240, 242 and retracts the latches 204, 206 out of their corresponding latch receptacles and into the mechanism housing 216, thereby unlocking the mechanism housing 216 from the article. In some implementations, hard stops 268, 270, 272, 274 are incorporated into the mechanism housing 216 that rest against ends of the latches 204, 206 in the depicted first (locked) position to prevent over rotation of the hub 236. This is technically advantageous in that it extends the life of the compliant magnetic locking mechanism 232.

Also attached at the distal ends of the arms 240, 242 are springs 252, 254, 256, 258 (e.g., leaf springs). Specifically, at the distal end of the arm 240 is a pair of opposing springs 252, 254 connected to the arm 240 and the latch 204 at the living hinge 248. The springs 252, 254 each connect to the mechanism housing 216 at housing receptacles 260, 262, respectively. The housing receptacles 260, 262 serve as seats for the springs 252, 254 to removably connect to the mechanism housing 216 (e.g., via a snapped or press-fit connection or merely slip-fit connection). Similarly, at the distal end of the arm 242 is a pair of opposing springs 256, 258 connected to the arm 242 and the latch 206 at the living hinge 250. The springs 256, 258 each connect to the mechanism housing 216 at housing receptacles 264, 266, respectively. The housing receptacles 264, 266 serve as seats for the springs 252, 254 to removably connect to the mechanism housing 216.

The springs 252, 254, 256, 258 may be bistable or monostable. In a bistable implementation, the springs 252, 254, 256, 258 bias the compliant magnetic locking mechanism 232 to the first (locked) position illustrated in FIG. 2 or the second (unlocked) position of FIG. 3 in a snap-over manner. Specifically, the springs 252, 254, 256, 258 are in a lower than maximum potential energy state in each of the first (locked) position and the second (unlocked) position, where the maximum potential energy state lies between these two positions. The springs 252, 254, 256, 258 snap over the maximum potential energy state to either the first (locked) position or the second (unlocked) position, thus creating a snap-over effect of the compliant magnetic locking mechanism 232. In the case of the bistable mechanism, no force is actually transferred between the latches 204, 206 and the rotating rotatable hub 236 when the mechanism is in the first or second position. The springs 252, 254, 256, 258 apply force directly to the latches 204, 206.

Bistable implementations may be technically advantageous in that a user or tooling may set the compliant magnetic locking mechanism 232 to the locked or unlocked position and expect the compliant magnetic locking mechanism 232 to remain in that position until a force is applied to move to the other position. Further, the compliant magnetic locking mechanism 232 may be stored in an unlocked positions and thus not require actuation prior to installation, thereby simplifying installation. The bistable implementation may also be advantageous in that it biases to one of two specific positions (locked and unlocked) and generally prevents the compliant magnetic locking mechanism 232 from occupying any positions therebetween in a static manner.

In a monostable implementation, the springs 252, 254, 256, 258 bias the compliant magnetic locking mechanism 232 to the first (locked) position illustrated in FIG. 2 exclusively of all other positions. This may be technically advantageous in that a user or tooling may only need to utilize the second (unlocked) position illustrated in FIG. 3 temporarily while installing or removing a cover from its corresponding device body. In all scenarios where no force is applied to a corresponding magnetic key, the compliant magnetic locking mechanism 232 can be assumed to maintain the first (locked) position. Monostable implementations may also be technically advantageous in that they bias to exclusively the locked position and generally prevents the compliant magnetic locking mechanism 232 from occupying any positions therebetween in a static manner, without a force being applied to pull the compliant magnetic locking mechanism 232 away from the first (locked) position. Therefore, a user always knows that the compliant magnetic locking mechanism 232 is locked absent a force being applied.

While not illustrated in FIG. 2 for the purposes of illustrating the compliant magnetic locking mechanism 232, a cover plate (see e.g., cover plate 118 of FIG. 1) is applied over the depicted mechanism housing 216 and compliant magnetic locking mechanism 232 to seal the compliant magnetic locking mechanism 232 within the mechanism housing 216 and form a cover (e.g., cover 102 of FIG. 1) for a computing device (e.g., computing device 110 of FIG. 1). The cover plate is fixedly attached to the mechanism housing 216, for example, by an adhesive.

All of the hub 236, the arms 240, 242, the latches 204, 206, and the springs 252, 254, 256, 258 are seated within the recess 234 in the mechanism housing 216. Further, the hub 236, the arms 240, 242, the latches 204, 206, and the springs 252, 254, 256, 258 are all of a continuous piece of material, with the living hinges 244, 246, 248, 250 defining boundaries between the rotatable hub, arms, latches, and springs. Use of the living hinges 244, 246, 248, 250 is technically advantageous over other hinged connections in that they permit the hub 236, the arms 240, 242, the latches 204, 206, and the springs 252, 254, 256, 258 (and potentially other parts of the locking mechanism 232) to all be formed from a common piece of material in a singular component, which reduces part count in manufacturing and assembly time and cost. This also increases the recyclability of the overall part as multiple constituent components can be recycled in a common stream. Still further, by combining the arms 240, 242 and the springs 252, 254, 256, 258, separate springs are eliminated, thus simplifying the overall design.

In various implementations, a cover that adopts the compliant magnetic locking mechanism 232 of FIG. 2 is made of only three separate components: the compliant magnetic locking mechanism 232, the mechanism housing 216, and a cover plate (not shown, see e.g., cover plate 118 of FIG. 1). In other implementations, the mechanism housing 316 and the cover plate are integrally formed with living hinges connecting the two and a snapped connection to enclose the compliant magnetic locking mechanism 232. In such implementations, the cover that adopts the compliant magnetic locking mechanism 232 of FIG. 2 is made of only two separate components. In either implementation, the completed cover is a stand-alone component that encompasses the compliant magnetic locking mechanism 232. In other implementations, the cover plate may be omitted if the recess 234 in the mechanism housing 216 is re-designed to face inward toward a computing device to be closed by the cover.

FIG. 3 illustrates another example compliant magnetic locking mechanism 332 in an unlocked position. The compliant magnetic locking mechanism 332 is housed within a recess 334 in a mechanism housing 316 (e.g., cover housing 116 for cover 102 of FIG. 1A). The recess 334 is specifically formed in the mechanism housing 316 to accommodate the compliant magnetic locking mechanism 332 in the unlocked position depicted in FIG. 3, a locked position, such as that depicted in FIG. 2, and all positions therebetween.

The compliant magnetic locking mechanism 332 includes a rotatable hub 336 with a radial arrangement of magnetic or ferromagnetic inserts 320, 321, 338, 339 seated within the mechanism housing 316. The inserts 320, 321, 338, 339 are slid or press fit within apertures in the hub 336 and the hub 336 is free-floating within the recess 334 with a tolerance with the mechanism housing 316 that permits rotation of the hub 336 within the recess 334.

In implementations where the inserts 320, 321, 338, 339 are magnetic, a similar arrangement of magnets or ferromagnetic elements within a magnetic key (not shown, see e.g., magnetic key 112 of FIGS. 1A-C) are used to engage the compliant magnetic locking mechanism 332 without externally accessible fasteners. In implementations where the inserts 320, 321, 338, 339 are ferromagnetic, the magnetic key incorporates magnetic elements to engage the compliant magnetic locking mechanism 332.

A pair of arms 340, 342 extend outwardly in a spiral formation from the hub 336 within the recess 334 of the mechanism housing 316. The arms 340, 342 are connected to the hub 336 at their proximal ends by living hinges 344, 346, respectively. The arms 340, 342 are used to convert rotation of the hub 336 into linear movement at their distal ends where latches 304, 306, respectively, are attached. The latches 304, 306 are also connected to the arms 340, 342 by living hinges 348, 350, respectively. The latches 304, 306 serve to selectively engage with latch receptacles (not shown, see e.g., latch receptacle 126 of FIG. 1A) in a device body (not shown, see e.g., device body 108 of FIGS. 1A-C) for a computing device (not shown, see e.g., computing device 110 of FIGS. 1A-C).

The latches 304, 306 engage the latch receptacles in the locked position of FIG. 2, while the latches 304, 306 disengage the latch receptacles in the depicted unlocked position of FIG. 3. Specifically, a user or tooling uses the magnetic key to rotate the hub 336 from its position as illustrated in FIG. 2 to the position illustrated in FIG. 3, as illustrated by arrows 328. This rotational movement of the hub 336 retracts the latches 304, 306 from their extended positions as illustrated in FIG. 2 to their retracted positions illustrated in FIG. 3, as illustrated by arrows 324. The depicted second (unlocked) position of the hub 336 pulls inward on the arms 340, 342 and retracts the latches 304, 306 out of their corresponding latch receptacles and into the mechanism housing 316, thereby unlocking the mechanism housing 316 from the article. In some implementations, hard stops 368, 370 are incorporated into the mechanism housing 316 that rest against ends of the arms 340, 342 proximal to the hub 336 in the depicted second (unlocked) position to prevent over rotation of the hub 336. This is technically advantageous in that it extends the life of the compliant magnetic locking mechanism 332.

Also attached at the distal ends of the arms 340, 342 are springs 352, 354, 356, 358 (e.g., leaf springs). Specifically, at the distal end of the arm 340 is a pair of opposing springs 352, 354 connected to the arm 340 and the latch 304 at the living hinge 348. The springs 352, 354 each connect to the mechanism housing 316 at housing receptacles 360, 362, respectively. The housing receptacles 360, 362 serve as seats for the springs 352, 354 to removably connect to the mechanism housing 316 (e.g., via a snapped or press-fit connection or merely slip-fit connection). Similarly, at the distal end of the arm 342 is a pair of opposing springs 356, 358 connected to the arm 342 and the latch 306 at the living hinge 350. The springs 356, 358 each connect to the mechanism housing 316 at housing receptacles 364, 366, respectively. The housing receptacles 364, 366 serve as seats for the springs 352, 354 to removably connect to the mechanism housing 316.

Figure 4:
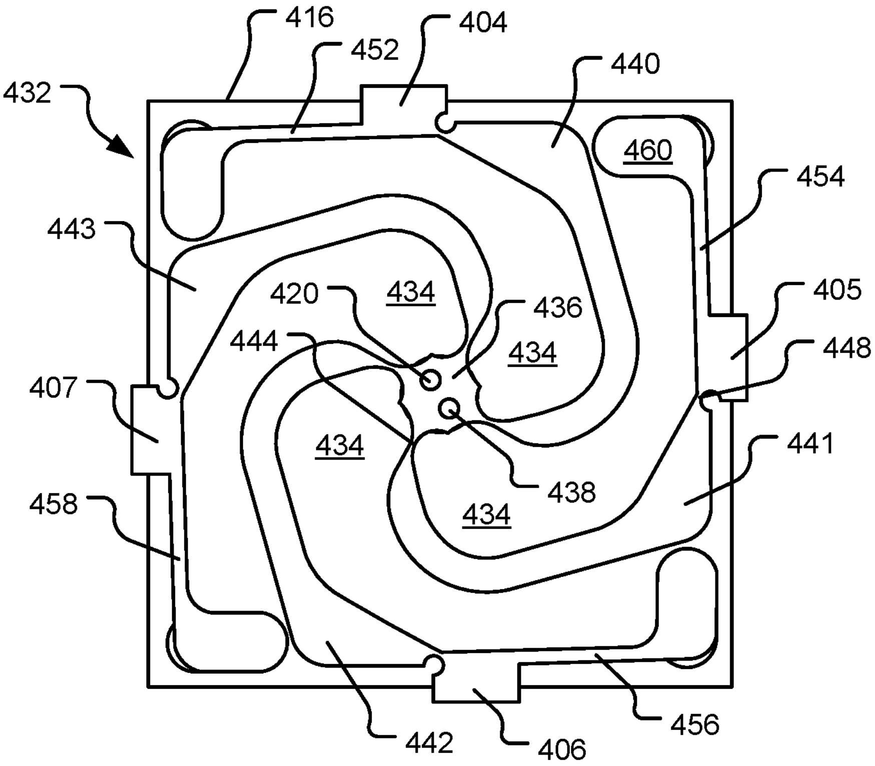
FIG. 4 illustrates another example compliant magnetic locking mechanism in a locked position.

FIG. 4 illustrates another example compliant magnetic locking mechanism 432 in a locked position. The compliant magnetic locking mechanism 432 is housed within a recess 434 in a mechanism housing 416 (e.g., cover housing 116 for cover 102 of FIG. 1A). The recess 434 is specifically formed in the mechanism housing 416 to accommodate the compliant magnetic locking mechanism 432 in the locked position depicted in FIG. 4, an unlocked position, such as that depicted in FIG. 5, and all positions therebetween.

The compliant magnetic locking mechanism 432 includes a rotatable hub 436 with a radial arrangement of magnetic or ferromagnetic inserts 420, 438 seated within the mechanism housing 416. The inserts 420, 438 are slid or press fit within apertures in the hub 436 and the hub 436 is free-floating within the recess 434. Other implementations may omit the inserts 420, 438 and instead utilize the apertures to mechanically manipulate rotation of the rotatable hub 436. In implementations where the inserts 420, 438 are magnetic, a similar arrangement of magnets or ferromagnetic elements within a magnetic key (not shown, see e.g., magnetic key 112 of FIGS. 1A-C) are used to engage the compliant magnetic locking mechanism 432 without externally accessible fasteners. In implementations where the inserts 420, 438 are ferromagnetic, the magnetic key incorporates magnetic elements to engage the compliant magnetic locking mechanism 432.

Four arms 440, 441, 442, 443 extend outwardly in a spiral formation from the hub 436 within the recess 434 of the mechanism housing 416. The arms 440, 441, 442, 443 are connected to the hub 436 at their proximal ends by living hinges (e.g., living hinge 444). The arms 440, 441, 442, 443 are used to convert rotation of the hub 436 into linear movement at their distal ends where latches 404, 405, 406, 407, respectively, are attached. The latches 404, 405, 406, 407 are also connected to the arms 440, 441, 442, 443 by living hinges (e.g., living hinge 448). The latches 404, 405, 406, 407 serve to selectively engage with latch receptacles (not shown, see e.g., latch receptacle 126 of FIG. 1A) in a device body (not shown, see e.g., device body 108 of FIGS. 1A-C) for a computing device (not shown, see e.g., computing device 110 of FIGS. 1A-C).

Figure 5:
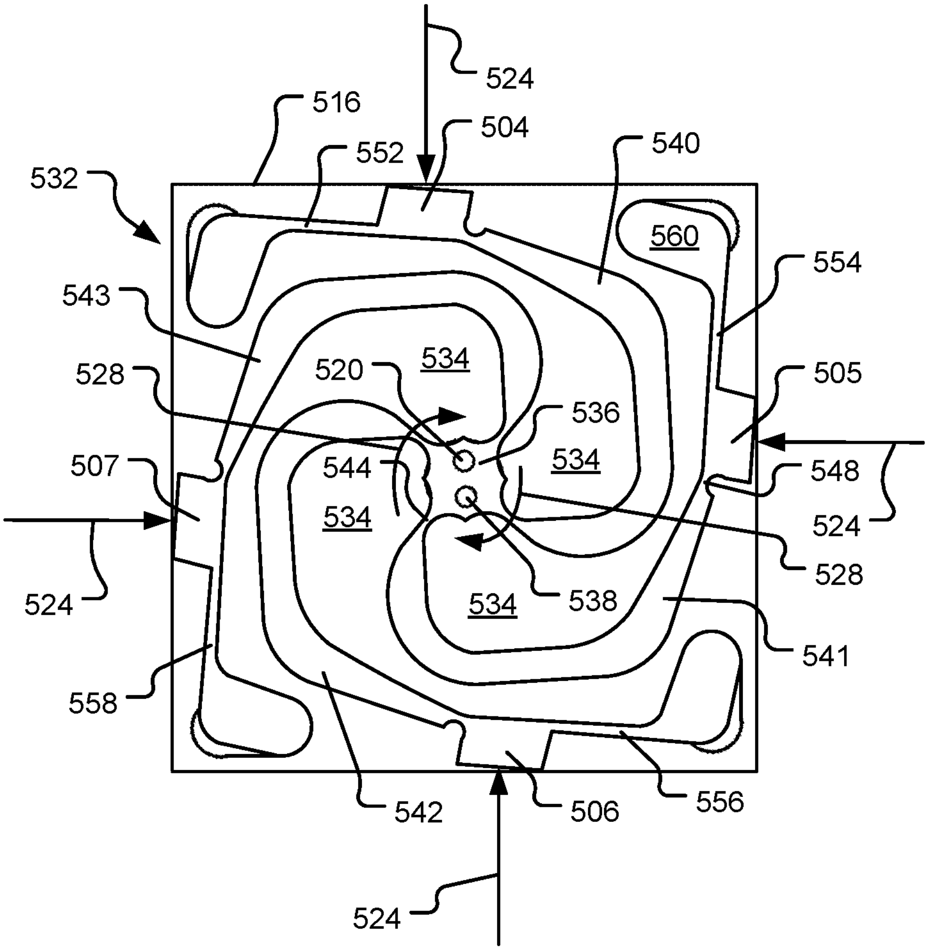
FIG. 5 illustrates another example compliant magnetic locking mechanism in an unlocked position.

The latches 404, 405, 406, 407 engage the latch receptacles in the depicted locked position of FIG. 4, while the latches 404, 405, 406, 407 disengage the latch receptacles in the unlocked position of FIG. 5. Specifically, the first (locked) position of the hub 436, as illustrated in FIG. 4, presses outward on the arms 440, 441, 442, 443 and extends the latches 404, 405, 406, 407 from the mechanism housing 416 (or cover housing 116 of FIG. 1) into corresponding latch receptacles within an article (e.g., device body 108 of FIGS. 1A-C), thereby locking the mechanism housing 416 to the article. A second (unlocked) position of the hub 436 (see e.g., FIG. 5) pulls inward on the arms 440, 441, 442, 443 and retracts the latches 404, 405, 406, 407 out of their corresponding latch receptacles and into the mechanism housing 416, thereby unlocking the mechanism housing 416 from the article.

Also attached at the distal ends of the arms 440, 441, 442, 443 are springs 452, 454, 456, 458 (e.g., leaf springs), respectively. Specifically, spring 454 is fixed or rotatably fixed to the mechanism housing 416 at fixed point 460 and extends to the latch 405 where the arm 441 is connected via the living hinge 448. The other arms 440, 442, 443 are similarly connected to their respective latches 404, 406, 407 and the mechanism housing 416 at fixed points. The fixed points serve as seats for the springs 452, 454, 456, 458 to removably connect to the mechanism housing 416. In some implementations, the arms 440, 441, 442, 443 operate in conjunction with the springs 452, 454, 456, 458 to provide the bistable or monostable spring forces described herein. In sum, the arms 440, 441, 442, 443 are arranged in a spiral formation extending outwardly from the hub 436 and terminating at fixed points about a perimeter of the mechanism housing 416, and each of the latches 404, 405, 406, 407 is attached to an outwardly-facing portion of one of the arms 440, 441, 442, 443 or springs 452, 454, 456, 458. The latches 404, 405, 406, 407 may be attached to any outwardly-facing portion of the arms 440, 441, 442, 443, though attaching the latches 404, 405, 406, 407 at or near the ends of the arms 440, 441, 442, 443, respectively, may be technically advantageous in that it maximizes use of the arms 440, 441, 442, 443, and thus the stroke of the latches 404, 405, 406, 407

The springs 452, 454, 456, 458 may be bistable or monostable. In a bistable implementation, the springs 452, 454, 456, 458 bias the compliant magnetic locking mechanism 432 to the first (locked) position illustrated in FIG. 4 or the second (unlocked) position of FIG. 5 in a snap-over manner. In a monostable implementation, the springs 452, 454, 456, 458 bias the compliant magnetic locking mechanism 432 to the first (locked) position illustrated in FIG. 4 exclusively of all other positions.

While not illustrated in FIG. 4 for the purposes of illustrating the compliant magnetic locking mechanism 432, a cover plate (see e.g., cover plate 118 of FIG. 1) is applied over the depicted mechanism housing 416 and compliant magnetic locking mechanism 432 to seal the compliant magnetic locking mechanism 432 within the mechanism housing 416 and form a cover (e.g., cover 102 of FIG. 1) for a computing device (e.g., computing device 110 of FIG. 1). The cover plate is fixedly attached to the mechanism housing 416, for example, by an adhesive.

All of the hub 436, the arms 440, 441, 442, 443, the latches 404, 405, 406, 407, and the springs 452, 454, 456, 458 are seated within the recess 434 in the mechanism housing 416. Further, the hub 436, the arms 440, 441, 442, 443, the latches 204, 206, and the springs 452, 454, 456, 458 are all of a continuous piece of material, with the living hinges defining boundaries between the rotatable hub, arms, and latches (and in some implementations, the springs).

FIG. 5 illustrates another example compliant magnetic locking mechanism 532 in an unlocked position. The compliant magnetic locking mechanism 532 is housed within a recess 534 in a mechanism housing 516 (e.g., cover housing 116 for cover 102 of FIG. 1A). The recess 534 is specifically formed in the mechanism housing 516 to accommodate the compliant magnetic locking mechanism 532 in the unlocked position depicted in FIG. 5, a locked position, such as that depicted in FIG. 4, and all positions therebetween.

The compliant magnetic locking mechanism 532 includes a rotatable hub 536 with a radial arrangement of magnetic or ferromagnetic inserts 520, 538 seated within the mechanism housing 516. The inserts 520, 538 are slid or press fit within apertures in the hub 536 and the hub 536 is free-floating within the recess 534 with a tolerance with the mechanism housing 516 that permits rotation of the hub 536 within the recess 534. Other implementations may omit the inserts 520, 538 and instead utilize the apertures to mechanically manipulate rotation of the rotatable hub 536.

In implementations where the inserts 520, 538 are magnetic, a similar arrangement of magnets or ferromagnetic elements within a magnetic key (not shown, see e.g., magnetic key 112 of FIGS. 1A-C) are used to engage the compliant magnetic locking mechanism 532 without externally accessible fasteners. In implementations where the inserts 520, 538 are ferromagnetic, the magnetic key incorporates magnetic elements to engage the compliant magnetic locking mechanism 532.

Four arms 540, 541, 542, 543 extend outwardly in a spiral formation from the hub 536 within the recess 534 of the mechanism housing 516. The arms 540, 541, 542, 543 are connected to the hub 536 at their proximal ends by living hinges (e.g., living hinge 544). The arms 540, 541, 542, 543 are used to convert rotation of the hub 536 into linear movement at their distal ends where latches 504, 505, 506, 507, respectively, are attached. The latches 504, 505, 506, 507 are also connected to the arms 540, 541, 542, 543 by living hinges (e.g., living hinge 548). The latches 504, 505, 506, 507 serve to selectively engage with latch receptacles (not shown, see e.g., latch receptacle 126 of FIG. 1A) in a device body (not shown, see e.g., device body 108 of FIGS. 1A-C) for a computing device (not shown, see e.g., computing device 110 of FIGS. 1A-C).

The latches 504, 505, 506, 507 engage the latch receptacles in the locked position of FIG. 4, while the latches 504, 505, 506, 507 disengage the latch receptacles in the depicted unlocked position of FIG. 5. Specifically, a user or tooling uses the magnetic key to rotate the hub 536 from its position as illustrated in FIG. 4 to the position illustrated in FIG. 5, as illustrated by arrows 528. This rotational movement of the hub 536 retracts the latches 504, 505, 506, 507 from their extended positions as illustrated in FIG. 4 to their retracted positions illustrated in FIG. 5, as illustrated by arrows 524. The depicted second (unlocked) position of the hub 536 pulls inward on the arms 540, 541, 542, 543 and retracts the latches 504, 505, 506, 507 out of their corresponding latch receptacles and into the mechanism housing 516, thereby unlocking the mechanism housing 516 from the article.

Also attached at the distal ends of the arms 540, 541, 542, 543 are springs 552, 554, 556, 558 (e.g., leaf springs). Specifically, spring 554 is fixed or rotatably fixed to the mechanism housing 516 at fixed point 560 and extends to the latch 505 where the arm 541 is connected via the living hinge 548. The other arms 540, 542, 543 are similarly connected to their respective latches 504, 506, 507 and the mechanism housing 516 at fixed points. The fixed points serve as seats for the springs 552, 554, 556, 558 to removably connect to the mechanism housing 516.

Other features and technical advantages of the compliant magnetic locking mechanism 332, 432, 532 of FIGS. 3, 4, and 5, respectively, may be as described above with reference to compliant magnetic locking mechanism 232 of FIG. 2 or elsewhere herein.

In various implementations, the covers that adopt a compliant magnetic locking mechanism (e.g., mechanisms 232, 332, 432, 532 of FIGS. 2, 3, 4, and 5, respectively) and the corresponding computing devices (e.g., computing device 110 of FIG. 1) disclosed herein are sealed to meet IPX5 or IPX6 in solid particle protection and/or IPX7 or IPX8 in in liquid ingress protection around, though, and between the cover and the computing device and other components of the interface between the cover and the computing device. For example, the various components disclosed herein may include plastic or rubber over molding or gaskets therebetween to seal the cover and/or computing device. Such sealing is technically advantageous as it prevents the covers disclosed herein from affecting an overall desired sealing capacity of the associated computing device.

XYZ coordinates are provided throughout the Figures to aid the detailed description, but do not limit the scope of the presently disclosed technology. In other implementations, features illustrated and described above with reference to specific Figures may be used in different combinations than that explicitly shown in each of the Figures and described with specific reference to each of the Figures.

Figure 6:
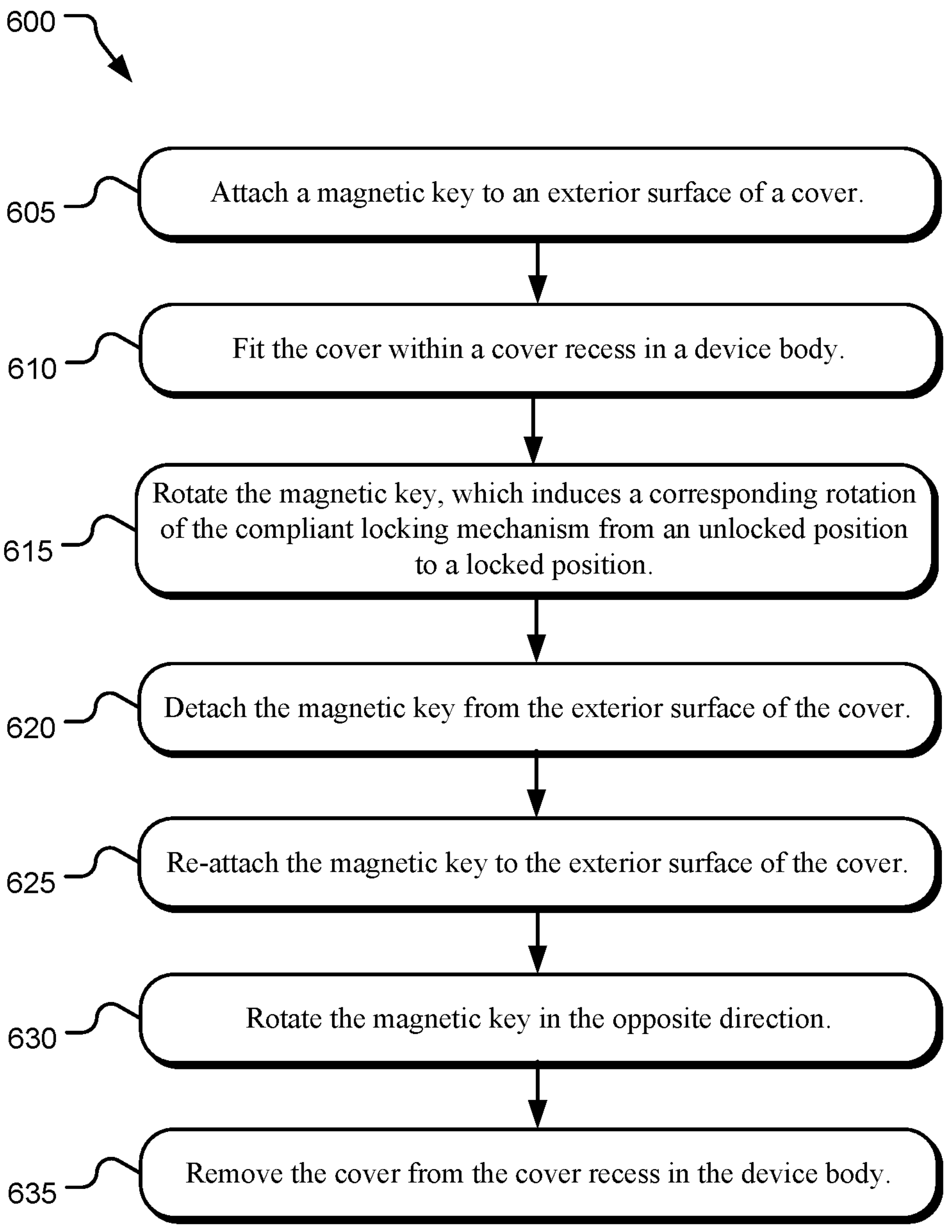
FIG. 6 illustrates example operations for attaching and removing a cover with a compliant magnetic locking mechanism to and from a device body for a computing device using a magnetic key.

FIG. 6 illustrates example operations 600 for attaching and removing a cover with a compliant magnetic locking mechanism to and from a device body for a computing device using a magnetic key. The compliant magnetic locking mechanism includes a rotatable hub including the first radial arrangement of magnetic or ferromagnetic inserts seated within the cover; one or more arms, each extending outwardly from the hub within the cover; and one or more latches, each attached to one of the arms.

An attaching operation 605 attaches a magnetic key to an exterior surface of the cover. The first radial arrangement of magnetic or ferromagnetic inserts seated within the compliant magnetic locking mechanism align with a second radial arrangement of magnetic or ferromagnetic inserts within the magnetic key. This alignment creates a magnetic attraction between the magnetic key and the cover, which holds the magnetic key in place on the cover.

A fitting operation 610 fits the cover within a cover recess in a device body. The device body is a chassis of a computing device or other device with the cover recess intended to align and the cover on the device body. A first rotating operation 615 rotates the magnetic key, which induces a corresponding rotation of the compliant magnetic locking mechanism from an unlocked position to a locked position. The unlocked position of the rotatable hub pulls inward on the arms and retracts the latches within the cover. The locked position of the rotatable hub presses outward on the arms and extends the latches from the cover into the latch receptacles within the device body, thereby locking the cover to the device body.

A detaching operation 620 detaches the magnetic key from the exterior surface of the cover. The detaching operation 620 may be performed by pulling on the magnetic key with a sufficient force to overcome the magnetic force holding the magnetic key to the cover. The cover is now magnetically secured to the device body without any exposed exterior fasteners.

A re-attaching operation 625 re-attaches the magnetic key to the exterior surface of the cover. Again, the first radial arrangement of magnetic or ferromagnetic inserts seated within the compliant magnetic locking mechanism aligns with the second radial arrangement of magnetic or ferromagnetic inserts within the magnetic key. This alignment creates a magnetic attraction between the magnetic key and the cover, which holds the magnetic key in place on the cover.

A second rotating operation 630 rotates the magnetic key in the opposite direction of the first rotating operation 615. This induces a corresponding rotation of the compliant magnetic locking mechanism from the locked position to the unlocked position. The unlocked position retracts the latches out of the latch receptacles within the device body, thereby unlocking the cover from the device body.

A removing operation 635 removes the cover from the cover recess in the device body. Maintenance or repair operations can then be performed on internal components of the computing device. The operations 600 may be performed manually by assembly or service personnel, or mechanically by assembly or dis-assembly equipment as part of a pick-and-place process.

The operations making up the embodiments of the presently disclosed technology described herein are referred to variously as operations, steps, objects, method steps, or modules. Furthermore, the operations may be performed in any order, adding or omitting operations as desired, unless explicitly claimed otherwise or a specific order is inherently necessitated by the claim language.

A compliant magnetic locking mechanism according to the presently disclosed technology may comprise a mechanism housing, a rotatable hub including a first radial arrangement of magnetic or ferromagnetic inserts seated within the mechanism housing, one or more arms, each extending outwardly from the hub within the mechanism housing, and one or more latches, each attached to one of the arms. A first position of the rotatable hub presses outward on the arms and extends the latches from the mechanism housing into corresponding latch receptacles within an article, thereby locking the mechanism housing to the article. A second position of the rotatable hub pulls inward on the arms and retracts the latches out of the corresponding latch receptacles and into the mechanism housing, thereby unlocking the mechanism housing from the article.

The compliant magnetic locking mechanism may further comprise a magnetic key including a second radial arrangement of magnetic or ferromagnetic inserts matched to the first radial arrangement of magnetic or ferromagnetic inserts when the magnetic key is placed adjacent an exterior surface of the mechanism housing. Rotation of the magnetic key may induce corresponding rotation of the rotatable hub between the first position and the second position.

The rotatable hub, one or more arms, and the one or more latches may all seated within a recess in the mechanism housing.

The arms may be arranged in a spiral formation extending outwardly from the hub and terminating at the latches. The compliant magnetic locking mechanism may further comprise one or more springs, each attached to a distal end of one of the arms.

The springs may be bistable to the first position and the second position.

The springs may be monostable to one of the first position and the second position.

The arms or the springs may terminate at fixed points about a perimeter of the mechanism housing, and each of the latches may be attached to an outwardly-facing portion of one of the arms or the springs.

The rotatable hub, arms, and latches are of a continuous piece of material, with living hinges may define boundaries between the rotatable hub, arms, and latches.

The mechanism housing may include one or more hard stops to prevent over rotation of the rotatable hub.

A method of using a compliant magnetic locking mechanism to attach a cover to a computing device according to the presently disclosed technology may comprise attaching a magnetic key to an exterior surface of the cover, wherein a first radial arrangement of magnetic or ferromagnetic inserts seated within the compliant magnetic locking mechanism align with a second radial arrangement of magnetic or ferromagnetic inserts within the magnetic key; fitting the cover within a cover recess in a device body; rotating the magnetic key, which induces a corresponding rotation of the compliant magnetic locking mechanism from an unlocked position to a locked position; and detaching the magnetic key from the exterior surface of the cover.

The method may further comprise re-attaching the magnetic key to the exterior surface of the cover, wherein the first radial arrangement of magnetic or ferromagnetic inserts seated within the compliant magnetic locking mechanism align with the second radial arrangement of magnetic or ferromagnetic inserts within the magnetic key; rotating the magnetic key, which induces a corresponding rotation of the compliant magnetic locking mechanism from the locked position to the unlocked position, the unlocked position retracting the latches out of the latch receptacles within the device body, thereby unlocking the cover from the device body; and removing the cover from the cover recess in the device body.

A computing device according to the presently disclosed technology may comprise a device body including a cover recess and one or more latch receptacles and a cover fit within the cover recess. The cover may include a mechanism housing and a compliant magnetic locking mechanism. The compliant magnetic locking mechanism may include a rotatable hub including a first radial arrangement of magnetic or ferromagnetic inserts seated within the mechanism housing, one or more arms, each extending outwardly from the hub within the mechanism housing, and one or more latches, each attached to one of the arms. A first position of the rotatable hub may press outward on the arms and extend the latches from the cover into the latch receptacles within the device body, thereby locking the cover to the device body. A second position of the rotatable hub may pull inward on the arms and retract the latches out of the latch receptacles within the device body, thereby unlocking the cover from the device body.

The computing device may further comprise a magnetic key including a second radial arrangement of magnetic or ferromagnetic inserts matched to the first radial arrangement of magnetic or ferromagnetic inserts when the magnetic key is placed adjacent an exterior surface of the cover. Rotation of the magnetic key may induce a corresponding rotation of the rotatable hub between the first position and the second position.

The rotatable hub, one or more arms, and the one or more latches may all seated within a recess in the mechanism housing.

The arms may be arranged in a spiral formation extending outwardly from the hub and terminating at the latches. The computing device may further comprise one or more springs, each attached to a distal end of one of the arms.

The springs may be bistable to the first position and the second position.

The springs may be monostable to one of the first position and the second position.

The arms or the springs may terminate at fixed points about a perimeter of the mechanism housing, and each of the latches may be attached to an outwardly-facing portion of one of the arms or the springs.

The rotatable hub, arms, and latches may be of a continuous piece of material, with living hinges defining boundaries between the rotatable hub, arms, and latches.

The mechanism housing may include one or more hard stops to prevent over rotation of the rotatable hub.

The above specification, examples, and data provide a complete description of the structure and use of exemplary implementations of the presently disclosed technology. Since many implementations of the presently disclosed technology can be made without departing from the spirit and scope of the invention, the invention resides in the claims hereinafter appended. Furthermore, structural features of the different implementations may be combined in yet another implementation without departing from the recited claims.

What is claimed is:

1. A compliant magnetic locking mechanism comprising:

a mechanism housing;

a rotatable hub including a first radial arrangement of magnetic or ferromagnetic inserts seated within the mechanism housing;

one or more arms, each extending outwardly from the hub within the mechanism housing;

one or more latches, each attached to one of the arms, wherein the arms are arranged in a spiral formation extending outwardly from the hub and terminating at the latches, and wherein:

a first position of the rotatable hub presses outward on the arms and extends the latches from the mechanism housing into corresponding latch receptacles within an article, thereby locking the mechanism housing to the article, and a second position of the rotatable hub pulls inward on the arms and retracts the latches out of the corresponding latch receptacles and into the mechanism housing, thereby unlocking the mechanism housing from the article; and and one or more springs, each attached to a distal end of one of the arms.

2. The compliant magnetic locking mechanism of claim 1, further comprising:

a magnetic key including a second radial arrangement of magnetic or ferromagnetic inserts matched to the first radial arrangement of magnetic or ferromagnetic inserts, wherein when the magnetic key is placed adjacent an exterior surface of the mechanism housing, and wherein rotation of the magnetic key induces corresponding rotation of the rotatable hub between the first position and the second position.

3. The compliant magnetic locking mechanism of claim 1, wherein the rotatable hub, one or more arms, and the one or more latches are all seated within a recess in the mechanism housing.

4. The compliant magnetic locking mechanism of claim 1, wherein the springs are bistable to the first position and the second position.

5. The compliant magnetic locking mechanism of claim 1, wherein the springs are monostable to one of the first position and the second position.

6. The compliant magnetic locking mechanism of claim 1, wherein the arms or the springs terminate at fixed points about a perimeter of the mechanism housing, and each of the latches is attached to an outwardly-facing portion of one of the arms or the springs.

7. The compliant magnetic locking mechanism of claim 1, wherein the rotatable hub, arms, and latches are of a continuous piece of material, with living hinges defining boundaries between the rotatable hub, arms, and latches.

8. The compliant magnetic locking mechanism of claim 1, wherein the mechanism housing includes one or more hard stops to prevent over rotation of the rotatable hub.

9. A method of using a compliant magnetic locking mechanism to attach a cover to a computing device, comprising:

attaching a magnetic key to an exterior surface of the cover, wherein a first radial arrangement of magnetic or ferromagnetic inserts seated within the compliant magnetic locking mechanism align with a second radial arrangement of magnetic or ferromagnetic inserts within the magnetic key;

fitting the cover within a cover recess in a device body;

rotating the magnetic key, which induces a corresponding rotation of the compliant magnetic locking mechanism from an unlocked position to a locked position, the compliant magnetic locking mechanism including:

a rotatable hub including the first radial arrangement of magnetic or ferromagnetic inserts seated within the cover;

one or more arms, each extending outwardly from the hub within the cover; and one or more latches, each attached to one of the arms, wherein:

the unlocked position of the rotatable hub pulls inward on the arms and retracts the latches within the cover; and the locked position of the rotatable hub presses outward on the arms and extends the latches from the cover into latch receptacles within the device body, thereby locking the cover to the device body; and detaching the magnetic key from the exterior surface of the cover.

10. The method of claim 9, further comprising:

re-attaching the magnetic key to the exterior surface of the cover, wherein the first radial arrangement of magnetic or ferromagnetic inserts seated within the compliant magnetic locking mechanism align with the second radial arrangement of magnetic or ferromagnetic inserts within the magnetic key;

rotating the magnetic key, which induces a corresponding rotation of the compliant magnetic locking mechanism from the locked position to the unlocked position, the unlocked position retracting the latches out of the latch receptacles within the device body, thereby unlocking the cover from the device body; and removing the cover from the cover recess in the device body.

11. A computing device comprising:

a device body including a cover recess and one or more latch receptacles; and a cover fit within the cover recess, the cover including:

a mechanism housing; and a compliant magnetic locking mechanism including:

a rotatable hub including a first radial arrangement of magnetic or ferromagnetic inserts seated within the mechanism housing;

one or more arms, each extending outwardly from the hub within the mechanism housing; and one or more latches, each attached to one of the arms, wherein:

a first position of the rotatable hub presses outward on the arms and extends the latches from the cover into the latch receptacles within the device body, thereby locking the cover to the device body, and a second position of the rotatable hub pulls inward on the arms and retracts the latches out of the latch receptacles within the device body, thereby unlocking the cover from the device body.

12. The computing device of claim 11, further comprising:

a magnetic key including a second radial arrangement of magnetic or ferromagnetic inserts matched to the first radial arrangement of magnetic or ferromagnetic inserts, wherein when the magnetic key is placed adjacent an exterior surface of the cover, and wherein rotation of the magnetic key induces corresponding rotation of the rotatable hub between the first position and the second position.

13. The computing device of claim 11, wherein the rotatable hub, one or more arms, and the one or more latches are all seated within a recess in the mechanism housing.

14. The computing device of claim 11, wherein the arms are arranged in a spiral formation extending outwardly from the hub and terminating at the latches, further comprising:

one or more springs, each attached to a distal end of one of the arms.

15. The computing device of claim 14, wherein the springs are bistable to the first position and the second position.

16. The computing device of claim 14, wherein the springs are monostable to one of the first position and the second position.

17. The computing device of claim 14, wherein the arms or the springs terminate at fixed points about a perimeter of the mechanism housing, and each of the latches is attached to an outwardly-facing portion of one of the arms or the springs.

18. The computing device of claim 11, wherein the rotatable hub, arms, and latches are of a continuous piece of material, with living hinges defining boundaries between the rotatable hub, arms, and latches.

19. The computing device of claim 11, wherein the mechanism housing includes one or more hard stops to prevent over rotation of the rotatable hub.

* * * * *